(12) United States Patent
Yukawa

(10) Patent No.: US 7,443,780 B2
(45) Date of Patent: Oct. 28, 2008

(54) OPTICAL PICKUP DEVICE AND OPTICAL DISK DEVICE HAVING A DIFFRACTION ELEMENT SO THAT A FIRST LIGHT BEAM AND A SECOND LIGHT BEAM COMPORT WITH EACH OTHER

(75) Inventor: Hiroaki Yukawa, Chiba (JP)

(73) Assignee: Sony Corporation (JP)

( * ) Notice: Subject to any disclaimer, the term of this patent is extended or adjusted under 35 U.S.C. 154(b) by 349 days.

(21) Appl. No.: 11/288,101

(22) Filed: Nov. 29, 2005

(65) Prior Publication Data

US 2006/0087951 A1    Apr. 27, 2006

Related U.S. Application Data

(62) Division of application No. 09/801,343, filed on Mar. 8, 2001, now Pat. No. 6,980,504.

(30) Foreign Application Priority Data

Mar. 10, 2000    (JP) .......................... P2000-072511

(51) Int. Cl.
*G11B 7/00* (2006.01)
(52) U.S. Cl. ................ 369/112.12; 369/44.11
(58) Field of Classification Search ............ 369/112.12, 369/44.23
See application file for complete search history.

(56) References Cited

U.S. PATENT DOCUMENTS

| | | | |
|---|---|---|---|
| 4,309,110 A | 1/1982 | Tumerman | |
| 5,243,583 A * | 9/1993 | Ohuchida et al. | 369/44.12 |
| 5,253,237 A | 10/1993 | Miyake et al. | |
| 5,497,227 A | 3/1996 | Takeuchi et al. | |
| 5,541,909 A | 7/1996 | Nakajima et al. | |
| 5,555,334 A | 9/1996 | Ohnishi et al. | |
| 5,589,982 A | 12/1996 | Faklis et al. | |
| 5,956,302 A * | 9/1999 | Maeda et al. | 369/44.23 |
| 5,959,704 A | 9/1999 | Suzuki et al. | |
| 6,067,197 A | 5/2000 | Blasiak et al. | |
| 6,072,624 A | 6/2000 | Dixon et al. | |
| 6,262,845 B1 | 7/2001 | Sweatt | |
| 6,400,664 B1 | 6/2002 | Shimano et al. | |
| 6,407,815 B2 | 6/2002 | Akihiro | |
| 6,510,119 B2 | 1/2003 | Takeshita et al. | |
| 6,512,608 B2 | 1/2003 | Ohyama | |
| 6,584,060 B1 | 6/2003 | Oohchida et al. | |
| 6,596,982 B1 | 7/2003 | Skokan et al. | |
| 6,646,975 B1 * | 11/2003 | Uchizaki et al. | 369/121 |
| 6,829,091 B2 * | 12/2004 | Kato et al. | 359/569 |
| 6,980,504 B2 * | 12/2005 | Yukawa | 369/112.12 |

* cited by examiner

*Primary Examiner*—William J. Klimowicz
*Assistant Examiner*—Parul Gupta
(74) *Attorney, Agent, or Firm*—Rader Fishman & Grauer PLLC; Ronald P. Kananen

(57) ABSTRACT

An optical pickup device is adapted to read information signals from optical recording media of two different types such as a "DVD" and a "CD" for which two light beams with different wavelengths are used and comprises a photodetector having a single light receiving section that can be shared by optical recording media of two different types. Both the light beam reflected from the signal recording surface of the "DVD" 106a and the light beam reflected from the signal recording surface of the "CD" 106b are diffracted by the diffraction element 6 and focused to a same spot on the light receiving surface of the photodiode of a photodetector 7.

4 Claims, 10 Drawing Sheets

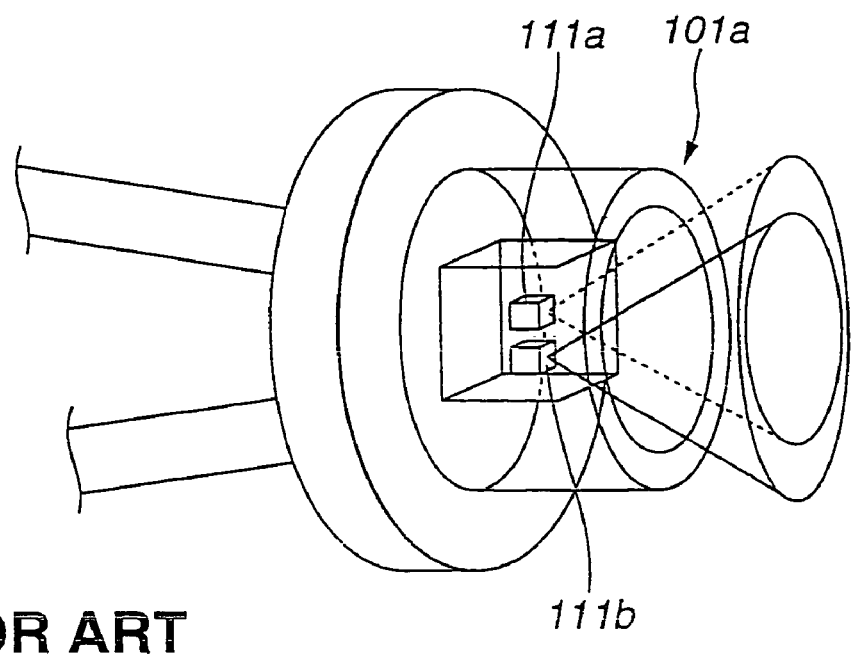
PRIOR ART
FIG.6
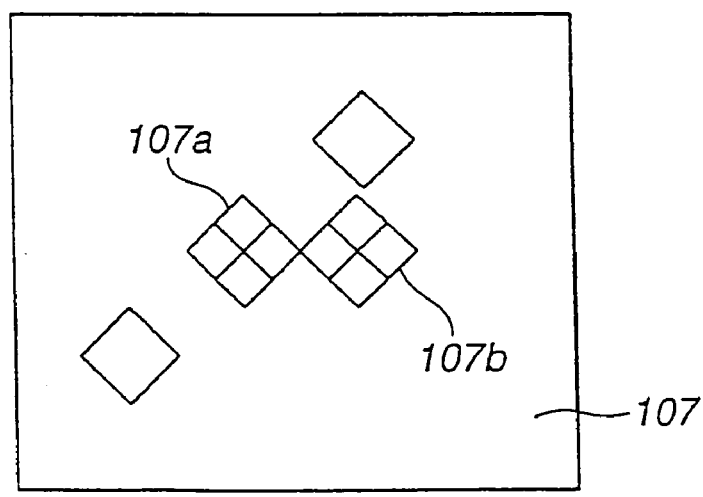
PRIOR ART  FIG.7

US 7,443,780 B2

OPTICAL PICKUP DEVICE AND OPTICAL DISK DEVICE HAVING A DIFFRACTION ELEMENT SO THAT A FIRST LIGHT BEAM AND A SECOND LIGHT BEAM COMPORT WITH EACH OTHER

RELATED APPLICATION

This application is a divisional application of application Ser. No. 09/801,343, filed on Mar. 8, 2001 now U.S. Pat. No. 6,980,504.

BACKGROUND OF THE INVENTION

1. Field of the Invention

This invention relates to an optical pickup device for writing information signals onto and reading information signals from an optical recording medium and also to an optical disc device provided with such an optical pickup device and adapted to record and reproduce information signals, using an optical disc as optical recording medium.

2. Related Background Art

Optical discs are known as optical recording medium and various optical pickup devices for reading information signals from an optical recording medium have been proposed to date.

Popular optical discs include "Compact Discs" (tradename, to be referred to as "CD" hereinafter) and "Digital Versatile Discs (tradename, to be referred to as "DVD" hereinafter) that can store information signals much more densely than CDs. Meanwhile, optical pickup devices adapted to read information signals from both "CDs" and "DVDs" are also known.

Referring to FIG. 1 of the accompanying drawings, an optical pickup device adapted to read information signals from both "CDs" and "DVDs" comprises a laser diode (LD) 101 operating as light source. The laser beam emitted from the laser diode 101 is typically red light (e.g., having a wavelength of 635 nm) and fed to a beam splitter 103 by way of a diffraction grating 102. The diffraction grating 102 is used to generate a sub-beam for detecting a tracking error signal. The beam splitter 103 is a plate having a pair of parallel surface planes that are inclined by 45 relative to the optical axis of the laser beam coming from the laser diode 101. The laser beam emitted from the laser diode 101 is reflected and deflected by 90 by the corresponding surface plane of the beam splitter 103 before it is collimated by a collimator lens 104 and enters an objective lens 105. The objective lens 105 focuses the incident laser beam on the signal recording surface of a "DVD" 106a or a "CD" 106b.

The laser beam focused on the signal recording surface of either the "DVD" 106a or the "CD" 106b is modulated according to the information signal recorded on the "DVD" 106a of the "CD" 106b, whichever appropriate" and reflected so that it returns to the objective lens 105 as reflected laser beam. The reflected laser beam then gets to the beam splitter 103 by way of the collimator lens 104. As the reflected laser beam is transmitted through the beam splitter 103, it gives rise to astigmatism and is subsequently focused on the light receiving surface of a photodetector (PD) 107. A focusing error signal, if any, can be detected on the basis of the astigmatism generated as a result of being transmitted through the beam splitter 103.

If the laser beam emitted from the light source is red light having a single wavelength, it cannot read any information signal from a "CD-R" that uses a coloring matter for the signal recording layer. This is because the reflectivity of the signal recording surface of a "CD-R" is very low relative to red light.

In view of this fact, there has been proposed an optical pickup device comprising a pair of light sources that are adapted to emit beams with different wavelengths as shown in FIG. 2 so that it may read information signals not only from "CDs" and "DVDs" but also from "CD-Rs" whose operation is highly dependent on the wavelength of light to be used with it.

With such an optical pickup device, a beam of red light (e.g., having a wavelength of 635 nm) is emitted from a laser diode 101 operating as the first light source and an infrared beam (e.g., having a wavelength of 780 nm) is emitted from a laser chip comprising a light receiving/light emitting composite element 109 and operating as the second light source.

The laser beam emitted from the laser diode 101 is fed to a beam splitter 103. The beam splitter 103 is a plate having a pair of parallel surface planes that are inclined by 45 relative to the optical axis of the laser beam coming from the laser diode 101. The laser beam emitted from the laser diode 101 is reflected and deflected by 90 by the corresponding surface plane of the beam splitter 103 before it is collimated by a dichroic beam splitter 108 and a collimator lens 104, and enters an objective lens 105. The objective lens 105 focuses the incident laser beam on the signal recording surface of a "DVD" 106a.

On the other hand, the laser beam emitted from the laser chip comprising the light receiving/light emitting composite element 109 is fed to a dichroic beam splitter 108. The dichroic beam splitter 108 has a reflection plane that is inclined by 45 relative to the optical axis of the laser beam coming from the laser chip comprising the light receiving/light emitting composite element 109. The laser beam emitted from the laser chip is reflected and deflected by 90 by the reflection plane. The laser beam emitted from the laser chip comprising the light receiving/light emitting composite element 109 and the laser beam emitted from the laser diode 101 are made to have a same and identical optical axis. The laser beam emitted from the laser chip comprising the light receiving/light emitting composite element 109 is then collimated by the collimator lens 104 and enters the objective lens 105. The objective lens 105 focuses the incident laser beam on the signal recording surface of a "CD" 106b.

The laser beam focused on the signal recording surface of either the "DVD" 106a or the "CD" 106b is then reflected by the signal recording surface thereof so that it returns to the objective lens 105 as reflected laser beam. The reflected laser beam then gets to the collimator lens 104 and the dichroic beam splitter 108. Since the dichroic beam splitter 108 transmits red light but reflects infrared beams, the optical path of the red beam and that of the infrared laser beam are separated from each other there.

The red beam transmitted through the dichroic beam splitter 108 then gets to the beam splitter 103 and, as it is transmitted through the beam splitter 103, it gives rise to astigmatism and is subsequently focused on the light receiving surface of a photodetector (PD) 107.

On the other hand, the infrared beam reflected by the reflection plane of the dichroic beam splitter 108 is focused on the light receiving surface of the photodetector of the light receiving/light emitting composite element 109.

Meanwhile, as a result of the advancement of semiconductor technologies in recent years, it has become possible to mount a pair of laser chips on a same semiconductor substrate as shown in FIG. 3 by using the so-called monolithic technology. More specifically, the light emitting spots 111a, 111b of a pair of laser chips can be arranged transversally side by side with a gap of only 80 m to 200 m separating them.

A light receiving/light emitting composite element 110 comprising a pair of laser chips 111a, 111b can be formed by arranging a photodetector 112 on a semiconductor substrate 114 in addition to the laser chips 111a, 111b. The light receiving/light emitting composite element 110 is additionally provided with a prism 113 arranged on the photodetector 113 and having its sloped plane faced to the laser chips 111a, 111b.

With the light receiving/light emitting composite element 110, the laser beams emitted from the laser chips 111a, 111b are reflected by the sloped plane of the prism 113 and directed to the outside of the light receiving/light emitting composite element 110. Then, they are reflected back to the light receiving/light emitting composite element 110 by the corresponding optical recording medium to enter the prism 113 and become detected by the photodetector.

Referring now to FIG. 4, with the optical pickup device that is adapted to read information signals from both a "CD" and a "DVD" by using a monolithic laser diode, the laser beams emitted from the laser chips 111a, 111b of the light receiving/light emitting composite element 110 are fed to the objective lens 105 by way of the collimator lens 104 so as to be focused on the signal recording surface of the "DVD" 106a or the "CD" 106b by the objective lens 105. Then, the laser beam reflected by the signal recording surface of the "DVD" 106a or the "CD" 106b, whichever appropriate, is fed back to the light receiving/light emitting composite element 110 and received by the photodetector of the light receiving/light emitting composite element 110.

In the light receiving/light emitting composite element 110, the pair of laser chips 111a, 111b that are used respectively for a "DVD" and a "CD" are separated from each other by a gap of about 120 m. Then, the two laser beams emitted from the respective laser chips 111a, 111b are made to strike the optical recording medium, keeping the distance of 120 m separating their optical axes from each other, so as to be reflected by the signal recording surface of the optical recording medium and fed back to the photodetector 112 of the light receiving/light emitting composite element 110.

The photodetector 112 has a first light receiving surface for receiving the laser beam to be used for a "DVD" that is reflected by the signal recording surface of a "DVD" and a second light receiving surface for receiving the laser beam to be used for a "CD" that is reflected by the signal recording surface of a "CD". The first and second light receiving surfaces are separated by a gap of about 120 m, which is same as the gap separating the laser chips 111a, 111b.

The above described optical system is so regulated that the laser beam to be used for a "DVD" occupies the center of the optical axis of the optical system and hence the laser beam to be used for a "CD" is displaced from the optical axis by the distance same as the distance separating the light emitting spots of the laser diode, or 120 m, in view of the fact that the operation of reading information signals from a "DVD" is more difficult than that of reading information signals from a "CD". The use of a hologram element has been proposed to correct the displacement of the laser beam due to the displaced light emitting spot thereof.

The use of a monolithic laser diode for an optical pickup device provides advantages including a reduced number of components, down-sizing and easier regulating operations during the manufacturing process.

It is also possible to form an optical system, using a monolithic diode in a discrete way as shown in FIG. 5. The laser diode 101a of the optical pickup device of FIG. 5 comprises first and second laser chips 111a, 111b as shown in FIG. 6.

The laser beams emitted from the laser diode 101a typically include a red laser beam and an infrared laser beam that are fed to a beam splitter 103 by way of a diffraction grating 102. The diffraction grating 102 is used to generate a sub-beam for detecting a tracking error signal. The beam splitter 103 is a plate having a pair of parallel surface planes that are inclined by 45 relative to the optical axis of the laser beam coming from the laser diode 101a. The laser beam emitted from the laser diode 101 a is reflected and deflected by 90 by the corresponding surface plane of the beam splitter 103 before it is collimated by a collimator lens 104 and enters an objective lens 105. The objective lens 105 focuses the incident laser beam on the signal recording surface of a "DVD" 106a or a "CD" 106b.

The laser beam focused on the signal recording surface of either the "DVD" 106a or the "CD" 106b is modulated according to the information signal recorded on the "DVD" 106a or the "CD" 106b, whichever appropriate and reflected so that it returns to the objective lens 105 as reflected laser beam. The reflected laser beam then gets to the beam splitter 103 by way of the collimator lens 104. As the reflected laser beam is transmitted through the beam splitter 103, it gives rise to astigmatism and is subsequently focused on the light receiving surface of a photodetector (PD) 107. A focusing error signal, if any, can be detected on the basis of the astigmatism generated as a result of being transmitted through the beam splitter 103.

With this optical pickup device again, the light receiving section 107a to be used for a "DVD" and the light receiving section 107b to be used for a "CD" of the photodetector 107 are separated from each other by a distance same as the gap separating the light emitting spots of the two laser chips 111a, 111b as seen from FIG. 7.

A discrete optical system is advantageous relative to an integrated optical system as shown in FIGS. 3 and 4 because it involves less diffracted light that is unnecessary to the system and it can be manufactured more easily.

With any of the above described optical pickup devices comprising a pair of light emitting spots, the two light emitting spots are separated from each other at least by a distance of about 80 m in view of the spatial restrictions imposed on it. Thus, in the case of a confocal optical system, two focal points are formed on the respective light receiving surfaces of the photodetector and separated from each other by a distance of about 80 m. Therefore, a pair of light receiving surfaces are arranged in the photodetector and separated from each other by at least about 80 m in order to receive the two laser beams that are focused to the respective focal points.

If the optical disc to be used with such an optical pickup device is driven to rotate at high speed in order to read information signals therefrom as in the case of a "CD-ROM", it is necessary to arrange a pair of I-V amplifiers near the respective light receiving surfaces on the semiconductor substrate of the photodetector. However, with the photodetector of any of the above described optical pickup devices, it is highly difficult to arrange such a pair of I-V amplifiers on the semiconductor substrate because the light receiving surfaces are arranged so tightly relative to each other with such a narrow gap separating them.

This problem may be dissolved by separating the two light emitting spots by a large gap. However, with a pair of light emitting spots that are separated from each other by a large distance, one of the laser beams will inevitably be displaced from the optical axis of the optical system also by a large distance to consequently degrade the optical performance of the optical system.

BRIEF SUMMARY OF THE INVENTION

In view of the above identified circumstances, it is therefore an object of the present invention to provide an optical pickup device adapted to read information signals from optical recording media of two different types such as a "DVD" and a "CD" for which two light beams with different wavelengths are used and comprising a photodetector having a single light receiving section that can be shared by optical recording media of two different types.

Another object of the present invention is to provide an optical disc device comprising such an optical pickup device.

According to the invention, the above objects are achieved by providing an optical pickup device comprising:

a first light source for emitting a first light beam having a first wavelength;

a second light source for emitting a second light beam having a second wavelength different from the first wavelength;

an objective lens for focusing said light beam or said second light beam to the signal recording surface of an optical of a first type matching to the first wavelength or that of an optical of a second type matching to the second wavelength, whichever appropriate;

a photodetector for detecting the light beam focused on the signal recording surface of the an optical of the first type or that of the an optical of the second type, whichever appropriate, by the objective lens and reflected by the signal recording surface; and a diffraction element arranged on the light path from the light sources to the photodetector by way of the two pieces of optical recording medium;

at least either the first light beam adapted to be used for reading information signals from the signal recording surface of the an optical of the first type and reflected by the reflecting surface or the second light beam adapted to be used for reading information signals from the signal recording surface of the an optical of the second type and reflected by the reflecting surface being diffracted by the diffraction element, the first reflected light beam and the second reflected light beam being focused to a same spot on the light receiving surface of the photodetector.

When both the first reflected light beam and the second reflected light beam are diffracted by the diffraction element, the diffraction element can be made to show a large angle of diffraction to consequently reduce the influence of any diffracted light that is unnecessary to the photodetector.

When the diffraction element is arranged on the light path between the two pieces of optical recording medium and the photodetector, it can be used efficiently for the light beam particularly when the light source is a laser diode regardless if the light beam is emitted from the first light source or from the second light source.

When the diffraction element is arranged on the light path between the light sources and the two pieces of optical recording medium, the optical axis of the first light beam striking the corresponding optical recording medium and that of the second light beam striking the corresponding optical recording medium can be made to accurately agree with each other.

The influence of the ambient temperature on the optical performance of the optical pickup device can be minimized by arranging a pair of diffraction gratings on the opposite surfaces of a single piece of medium to form the diffraction element.

On the other hand, when the diffraction element is formed by using two pieces of medium, each carrying a diffraction grating on one of the opposite surfaces thereof, the influence of the ambient temperature on the optical performance of the optical pickup device can also be minimized and, additionally, the position of the light spot on the photodetector can be regulated by moving and regulating the diffraction element.

According to the invention, there is also provided an optical disc device comprising an optical pickup device according to the invention and a rotary operating mechanism for driving the optical disc, or the optical recording medium, to rotate and operate it, the optical pickup device being arranged opposite to the signal recording surface of the optical disc to be driven to rotate and operated by the rotary operating mechanism.

As pointed out above, in an optical pickup device according to the invention, either the first light beam adapted to be used for reading information signals from the signal recording surface of the recording medium of the first type and reflected by the reflecting surface or the second light beam adapted to be used for reading information signals from the signal recording surface of the optical recording medium of the second type and reflected by the reflecting surface is diffracted by the diffraction element and the first reflected light beam and the second reflected light beam are focused to a same spot on the light receiving surface of the photodetector.

When both the first reflected light beam and the second reflected light beam are diffracted by the diffraction element, the diffraction element can be made to show a large angle of diffraction to consequently reduce the influence of any diffracted light that is unnecessary to the photodetector.

When the diffraction element is arranged on the light path between the two pieces of optical recording medium and the photodetector, it can be used efficiently for the light beam particularly when the light source is a laser diode regardless if the light beam is emitted from the first light source or from the second light source.

When the diffraction element is arranged on the light path between the light sources and the two pieces of optical recording medium, the optical axis of the first light beam striking the corresponding optical recording medium and that of the second light beam striking the corresponding optical recording medium can be made to accurately agree with each other.

The influence of the ambient temperature on the optical performance of the optical pickup device can be minimized by arranging a pair of diffraction gratings on the opposite surfaces of a single piece of medium to form the diffraction element.

On the other hand, when the diffraction element is formed by using two pieces of medium, each carrying a diffraction grating on one of the opposite surfaces thereof, the influence of the ambient temperature on the optical performance of the optical pickup device can also be minimized and, additionally, the position of the light spot on the photodetector can be regulated by moving and regulating the diffraction element.

Thus, according to the invention, there is provided an optical pickup device adapted to read information signals from optical recording media of two different types such as a "DVD" and a "CD" for which two light beams with different wavelengths are used and comprising a photodetector having a single light receiving section that can be shared by optical recording media of two different types whereas maintaining a stable operation.

According to the invention, there is also provided an optical disc device comprising such an optical pickup device.

BRIEF DESCRIPTION OF THE SEVERAL VIEWS OF THE DRAWING

FIG. 6 is a schematic perspective view of the monolithic laser diode of the two-wavelength type used in a known optical pickup device;

FIG. 7 is an enlarged schematic plane view of a principal part of the light receiving section of the photodetector of the known optical pickup device of FIG. 5;

DETAILED DESCRIPTION OF THE INVENTION

Now, the present invention will be described in greater detail by referring to the accompanying drawings that illustrate preferred embodiments of the invention.

Figure 1:
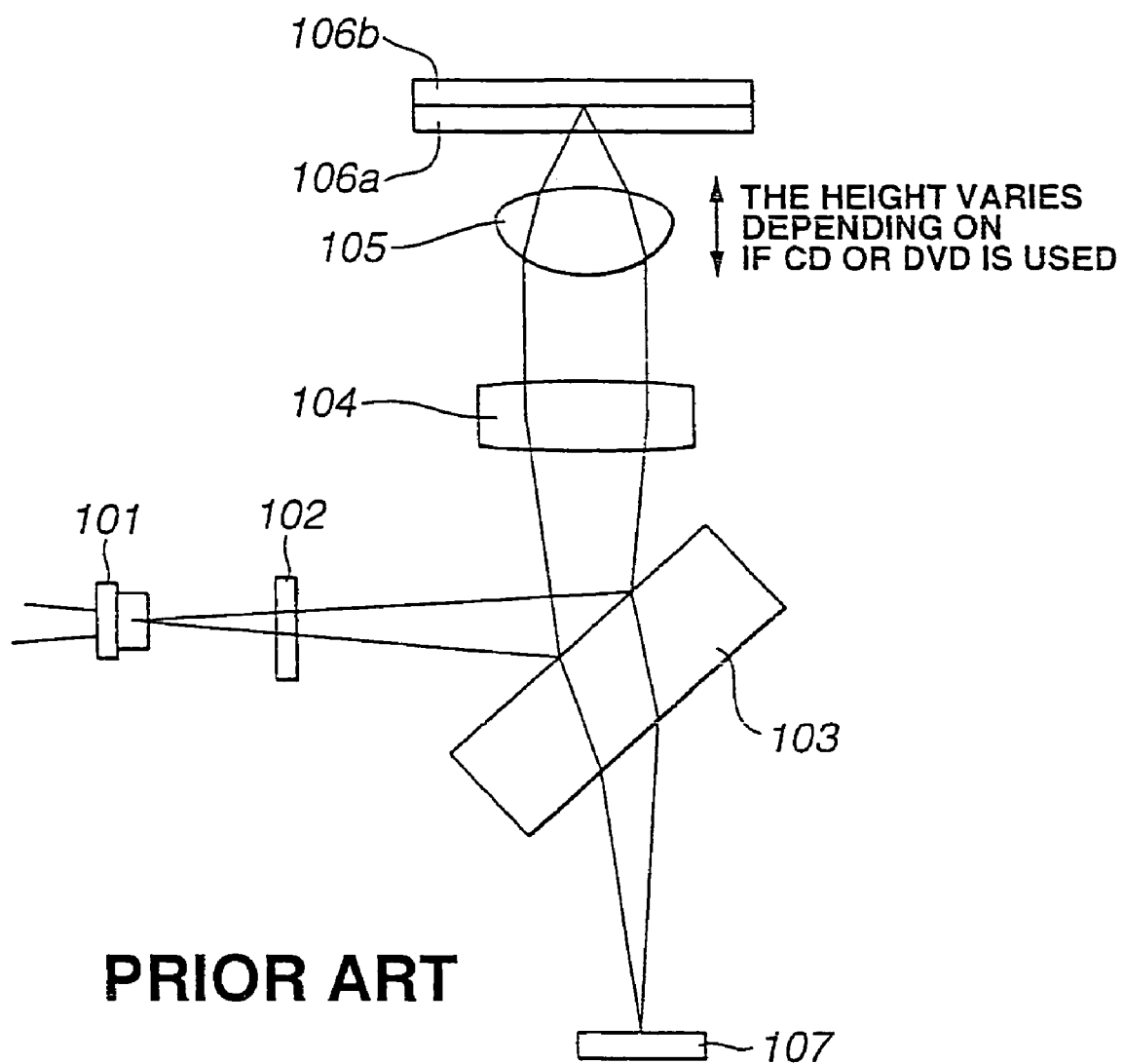
FIG. 1 is a schematic lateral view of the optical system of a known optical pickup device of the type using a single wavelength.
Figure 2:
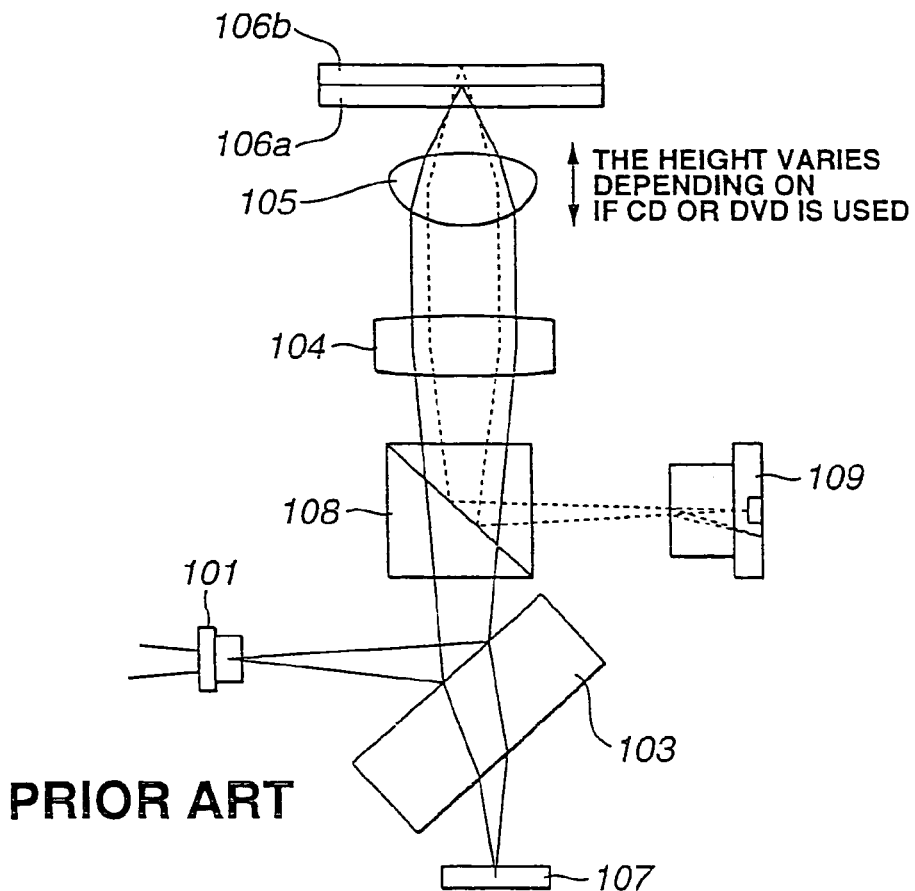
FIG. 2 is a schematic lateral view of the optical system of a known optical pickup device of the type comprising two light sources and using two wavelengths.
Figure 3:
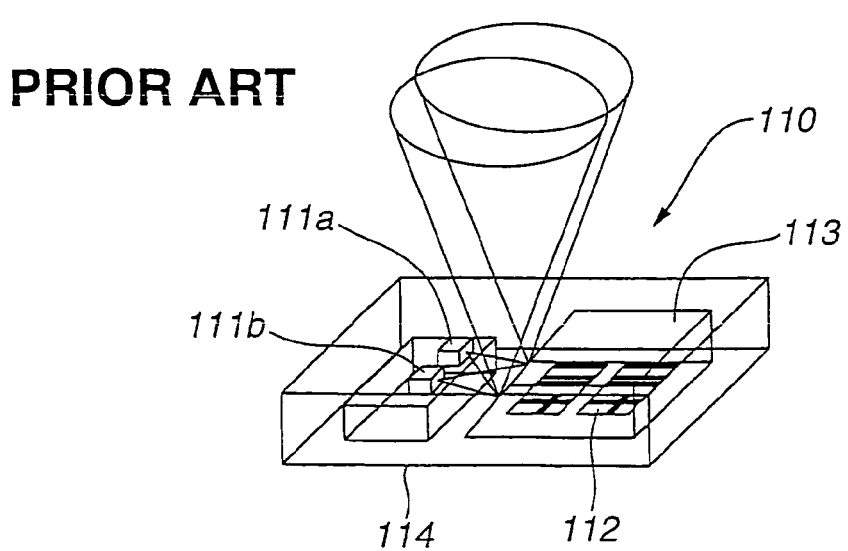
FIG. 3 is a schematic perspective view of a light receiving/light emitting composite element of the two-wavelength type used in a known optical pickup device.
Figure 4:
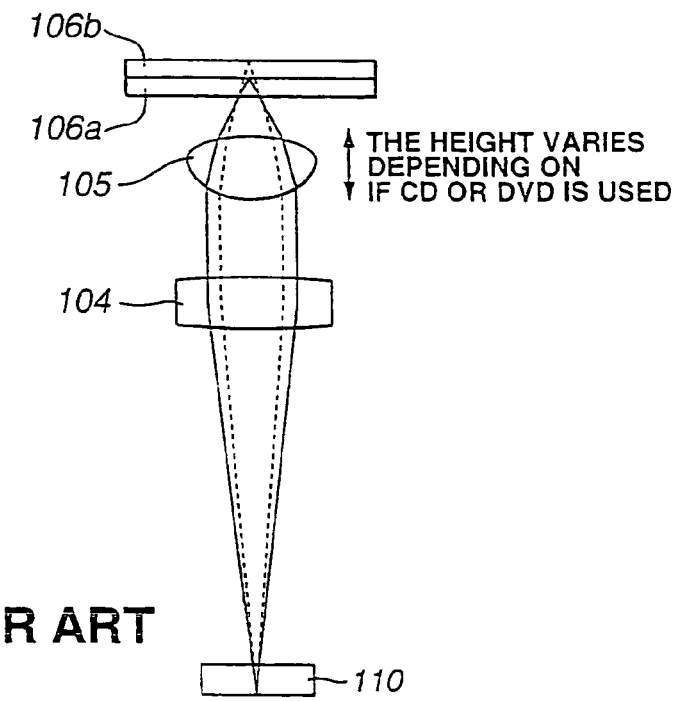
FIG. 4 is a schematic lateral view of the optical system of a known optical pickup device comprising a light receiving/light emitting composite element of the two-wavelength type.
Figure 5:
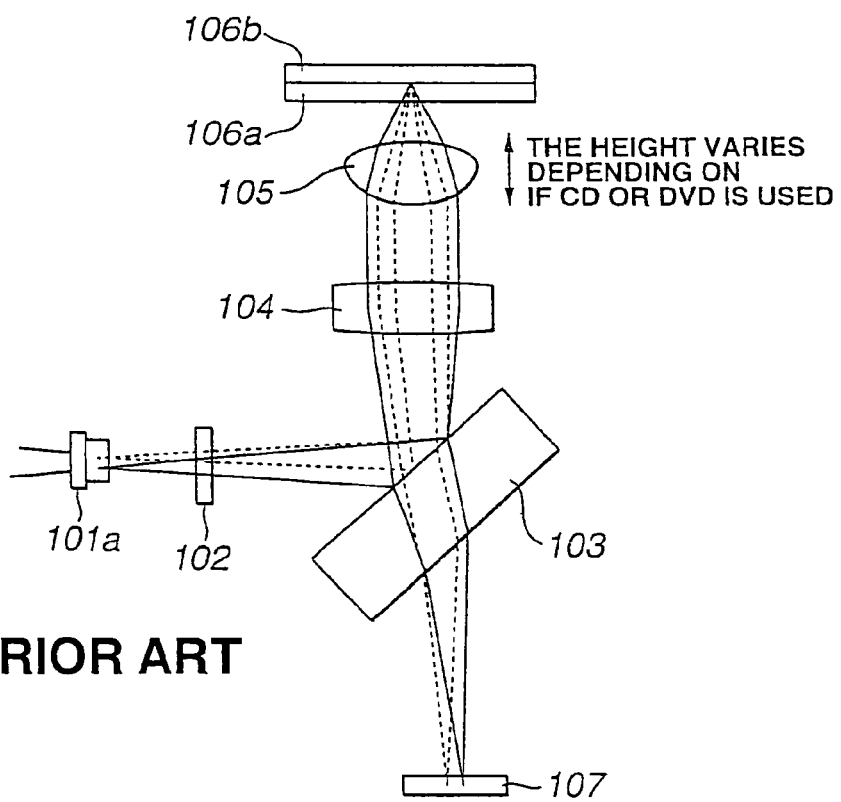
FIG. 5 is a schematic lateral view of the optical system of a known optical pickup device comprising a monolithic laser diode and using two wavelengths.
Figure 8:
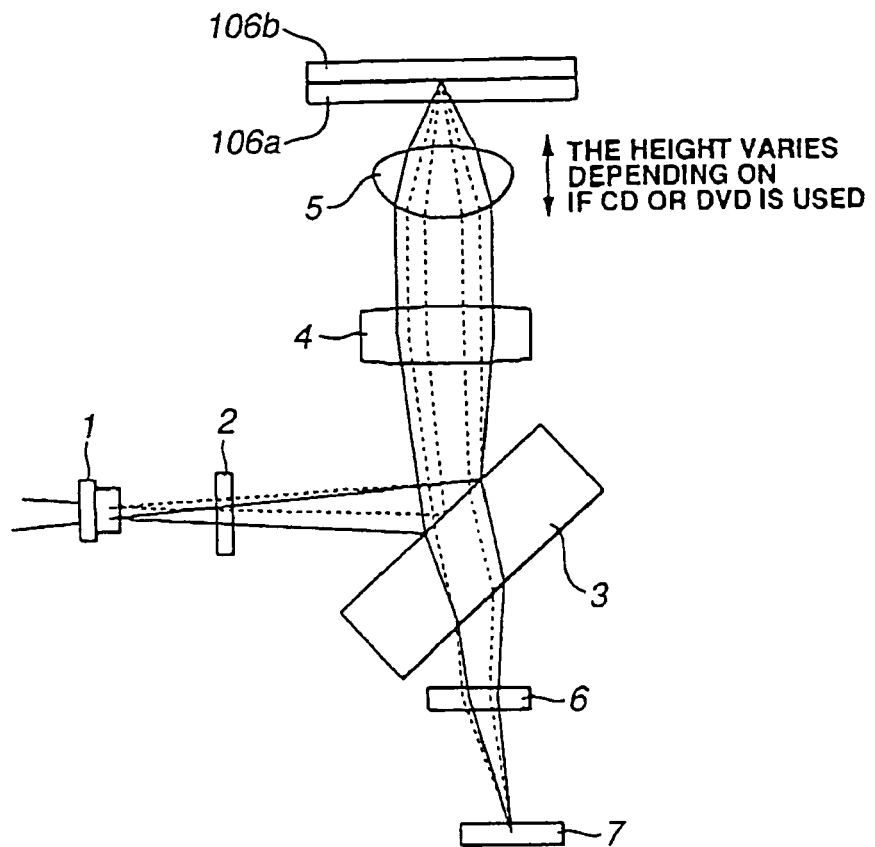
FIG. 8 is a schematic lateral view of the optical system of an embodiment of optical pickup device according to the invention.

FIG. 8 is a schematic lateral view of the optical system of the first embodiment of optical pickup device according to the invention and adapted to use a so-called "DVD (Digital Versatile Disc)" (tradename) as optical recording medium of the first type and a so-called "CD (Compact Disc)" as optical recording medium of the second type. Typically, the "DVD" is adapted to a wavelength of 635 nm, while the "CD" is adapted to a wavelength of 780 nm.

As shown in FIG. 8, the optical pickup device comprises an optical system realized by discretely using a monolithic laser diode. The laser diode of the optical pickup device has two laser chips, a first laser chip and a second laser chip, contained in a single package. The two laser chips are separated from each other by a distance between 80 m and 120 m. The first laser chip is adapted to emit a first laser beam that is a red laser beam (with a wavelength of 635 nm), whereas the second laser chip is adapted to emit a second laser beam that is an infrared laser beam (with a wavelength of 780 nm). The light beam emitted from the laser diode 1 gets to a beam splitter 3 by way of a diffraction grating 2. The diffraction grating 2 is used to generate a pair of sub-beams to be used for detecting a tracking error signal. The beam splitter 3 is a plate having a pair of parallel surface planes that are inclined by 45 relative to the optical axis of the laser beam coming from the laser diode 1. The laser beam emitted from the laser diode 1 is reflected and deflected by 90 by the corresponding surface plane of the beam splitter 3 before it is collimated by a collimator lens 4 and enters an objective lens 5. The objective lens 5 focuses the incident laser beam on the signal recording surface of a "DVD" 106a or a "CD" 106b.

The laser beam focused on the signal recording surface of either the "DVD" 106a or the "CD" 106b is modulated according to the information signal recorded on the "DVD" 106a of the "CD" 106b, whichever appropriate" and reflected so that it returns to the objective lens 5 as reflected laser beam.

Figure 9:
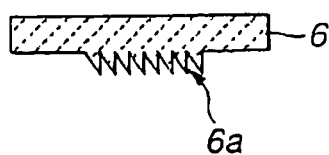
FIG. 9 is a schematic lateral view of the diffraction element of the embodiment of optical pickup device of FIG. 8, showing its profile.
Figure 10:
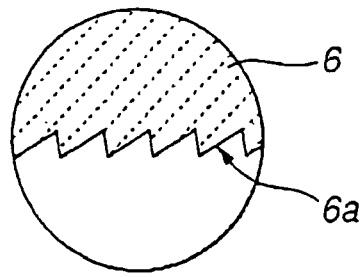
FIG. 10 is an enlarged schematic lateral view of a principal part of the diffraction element of FIG. 9, showings its profile.

The reflected laser beam then gets to the beam splitter 3 by way of the collimator lens 4. As the reflected laser beam is transmitted through the beam splitter 3, it gives rise to astigmatism and is subsequently transmitted through a diffraction element 6. As shown in FIG. 9, the diffraction element 6 is realized by forming a diffraction grating pattern 6a on one of the opposite surfaces of a plate of a medium having a pair of parallel surface planes. As shown in FIG. 10, the diffraction grating pattern 6a is that of a blazed diffraction grating designed to enhance the diffraction efficiency of a specific degree. For instance, if the diffracted light beam of the 1st degree is used for each of the reflected laser beams, the diffraction grating pattern of the diffraction element 6 is made to show a depth somewhere between the depth that maximizes the primary diffraction efficiency of the first reflected light beam and the depth that maximizes the primary diffraction efficiency of the second reflected light beam.

Both the diffracted light beam of the 1st degree of the first reflected light beam produced by the diffraction element 6 and that of the second reflected light beam produced by the diffraction element 6 are then focused to the focal point on the light receiving section 7a of the photodetector 7. With this optical pickup device, it should be reiterated that both the diffracted light beam of the 1st degree of the first reflected light beam and that of the second reflected light beam are focused to a same focal point on a same light receiving section 7a. Both the diffracted light beam of the 1st degree of the first reflected light beam and that of the second reflected light beam are focused to a same focal point on a same light receiving section 7a because the distance separating the focal points of the two light beams that corresponds to the distance separating the two light emitting spots of the laser diode 1 is offset by the difference in the diffraction angle of the two reflected light beams.

For a diffraction grating, if the cycle of the grating is a, the wavelength of the incident laser beam is ë and the degree of diffraction is n, the diffraction angle è of the diffracted light beam of the n-th degree is expressed by formula below.

$$\sin è = në/a$$

Figure 11:
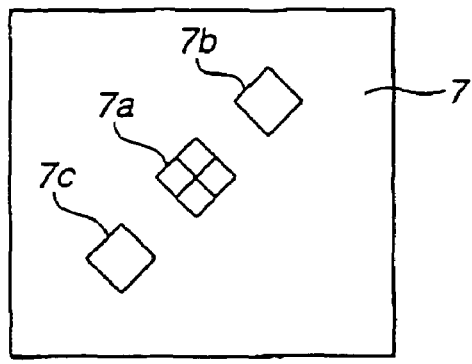
FIG. 11 is an enlarged schematic plan view of the light receiving section of the photodetector of the optical pickup device of FIG. 8.

The photodetector 7 is adapted to detect a focusing error signal, if any, on the basis of the astigmatism produced when the light beam is transmitted through the beam splitter 3. The pair of sub-beams generated by the diffraction grating 2 also gets to the photodetector 7 by way of the above described light path. A focusing error signal can be detected by the photodetector 7 by detecting the reflected light beams of the sub-beams. More specifically, as shown in FIG. 11, the photodetector 7 comprises a main light receiving section 7a and a pair of auxiliary light receiving sections 7b, 7c for receiving the reflected light beams of the sub-beams. The main light receiving section 7a is divided into four light receiving areas that are arranged radially as viewed from the center thereof so that the photodetection output of each of the light receiving areas can be obtained independently. Then, a focusing error signal can be obtained by means of a so-called astigmatism method of performing arithmetic operations using the photodetection outputs of the light receiving areas. On the other hand, each of the paired auxiliary light receiving sections 7b, 7c has a single light receiving area and they can obtain their respective photodetection outputs independently. A tracking error signal, if any, can be detected by the photodetector 7 by means of a so-called 3-beam method of performing arithmetic operations using the photodetection outputs of the auxiliary light receiving sections 7b, 7c.

With this optical pickup device, a large diffraction angle can be used for the diffraction element 6 to minimize the influence of any diffracted light that is unnecessary to the photodetector because both the diffracted light beam of the 1st degree the first reflected light beam and that of the second reflected light beam of the diffraction element 6 are used for reading information signals.

With the above described optical pickup device, the spots of the reflected light beams formed on the light receiving sections of the photodetector can be shifted as a result of a change in the diffraction angle of the diffraction element due to the change in the wavelength of any of the light beams emitted from the laser diode that is by fluctuations in the ambient temperature. However, such a shift of the spots of light in the photodetector can be corrected by using a medium whose refractive index changes as a function of temperature such as a plastic material for the beam splitter so that the shift of the spots of light caused by the change in the refractive index may be offset by the shift of the spots of light caused by the change in the diffraction angle of the diffraction element.

Additionally, with the above described optical pickup device, the spots of the reflected light beams in the photodetector can be shifted in a direction perpendicular to the optical axis by shifting and regulating the position of the diffraction element. Therefore, any positional displacement of the spots of light due to the dimensional errors of any of the optical elements of the device can be corrected by shifting and regulating the position of the diffraction element. The sensitivity of the diffraction element to such a regulating operation rises as the diffraction angle of the diffraction element is increased.

Figure 12:
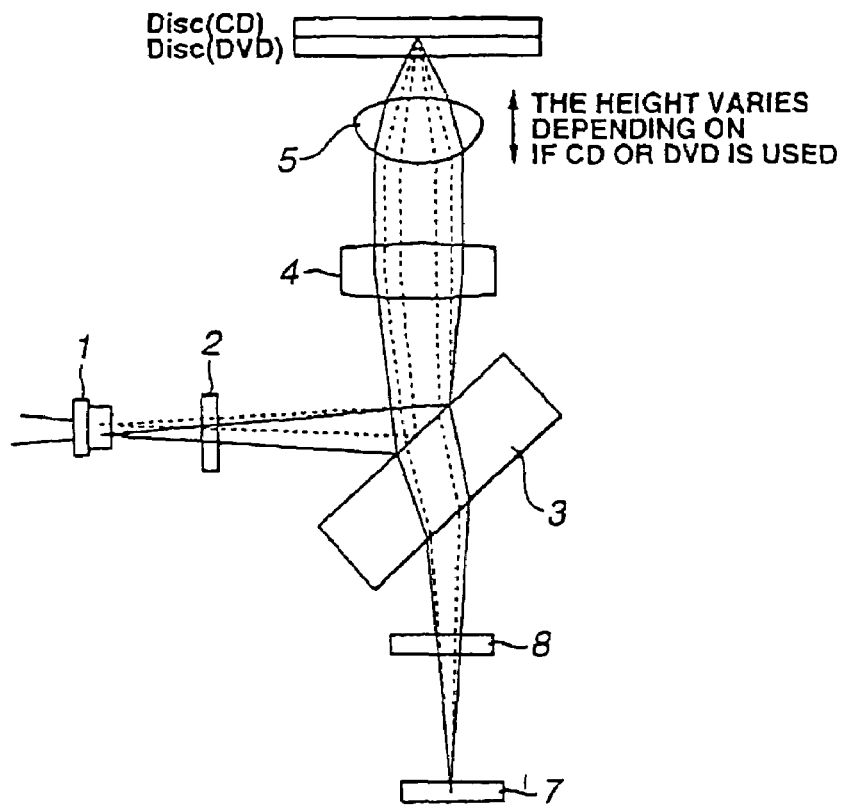
FIG. 12 is a schematic lateral view of the optical system of another embodiment of optical pickup device according to the invention.
Figure 13:
FIG. 13 is a schematic lateral view of the diffraction element of the embodiment of optical pickup device of FIG. 12, showing its profile.
Figure 14:
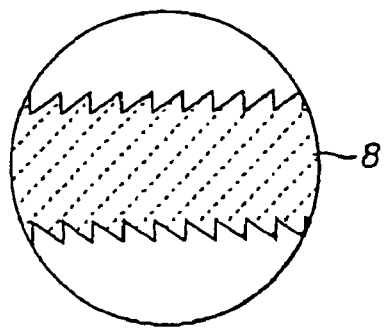
FIG. 14 is an enlarged schematic lateral view of a principal part of the diffraction element of FIG. 13, showings its profile.

FIG. 12 is a schematic lateral view of the optical system of another embodiment of optical pickup device according to the invention, wherein the diffraction element 8 arranged on the optical path between the beam splitter 3 and the photodetector 7 is prepared by forming a diffraction grating on each of a pair of oppositely disposed surfaces of a single piece of medium as shown in FIG. 13. Note that, in FIG. 14, the diffraction patterns arranged on the opposite surfaces of the medium that is a plate having a pair of parallel surface planes are mirror images relative to each other.

With this arrangement, it is not necessary for the first reflected light beam and the second reflected light beam that the laser beams getting to the light receiving sections of the photodetector 7 are diffracted laser beams. For example, it may be so arranged that the light beam of the 0-th degree (or the light beam that is not diffracted) of the diffraction element 8 is detected by the photodetector 7 for the first reflected light beam and the light beam of the 1st order of the diffraction element 8 is detected by the photodetector for the second reflected light beam.

When such a diffraction element 8 is used, the influence of the ambient temperature on the performance of the diffraction element 8 can be minimized. More specifically, since changes occur symmetrically in the performance of the diffraction patterns due to the fluctuations of the ambient temperature on the opposite surfaces of the medium of the diffraction element 8, the change in the diffraction efficiency relative to one of the reflected laser beams is offset by the change in the diffraction efficiency relative to the other reflected light beam so that the light beams transmitted through the diffraction element 8 are not influenced by such changes.

Additionally, the changes in the diffraction angle due to the changes in the oscillation wavelengths of the laser diode are offset by each other due to the diffraction patterns on the opposite surfaces of the diffraction element 8, the spots of the reflected light beams on the light receiving sections of the photodetector 7 are not shifted if the oscillation frequencies of the laser diode are made to vary due to the fluctuations of the ambient temperature.

With the above arrangement, since any shift of the optical axis of each of the reflected light beams is corrected only during the light beam is transmitted between the two diffraction patterns, or through the medium of the diffraction element 8, the diffraction angle is large if compared with the arrangement of FIG. 8 where the shift of the optical axis is corrected over the entire light path between the diffraction element 8 and the photodetector.

When the diffraction element 8 is arranged on the backward light path from the optical discs 106a, 106b to the photodetector 7 as shown in FIG. 12, both the light beam emitted from the first light source and the light beam emitted from the second light source can be used efficiently if the light sources are those of a laser diode and the dispersion angle of each of the light beams therefrom is limited.

Note that the diffraction element 8 may alternatively be arranged on the forward light path from the light sources to the optical discs. If such is the case, the optical axis of the first light beam and that of the second light beam respectively striking the optical discs 106a, 106b can be made to accurately agree with each other.

Still alternatively, it may be so arranged that both of the light beams to be detected by the photodetector 7 for the first reflected light beam and the second reflected light beam are diffracted by the diffraction element 8. More specifically, for examples, it may be so arranged that the diffracted light beam of the 1st degree from the diffraction element 8 for the first reflected light beam is detected by the photodetector 7 and the diffracted light beam of the 2nd degree from the diffraction element 8 for the second reflected light beam is detected by the photodetector 7. With this arrangement, the diffraction angle of the diffraction element becomes large to reduce the influence of any diffracted light that is unnecessary to the photodetector.

Figure 15:
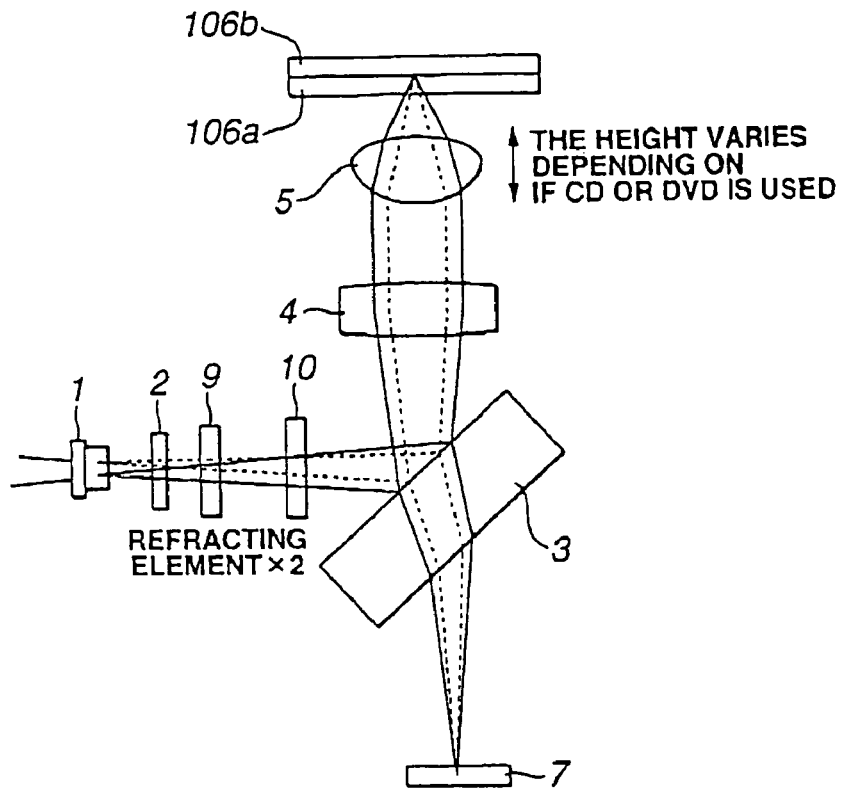
FIG. 15 is a schematic lateral view of the optical system of still another embodiment of optical pickup device according to the invention.
Figure 16:
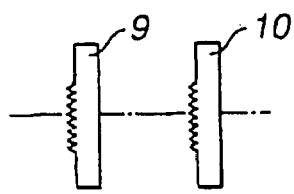
FIG. 16 is a schematic lateral view of the diffraction element of the embodiment of optical pickup device of FIG. 15, showing its profile.
Figure 17:
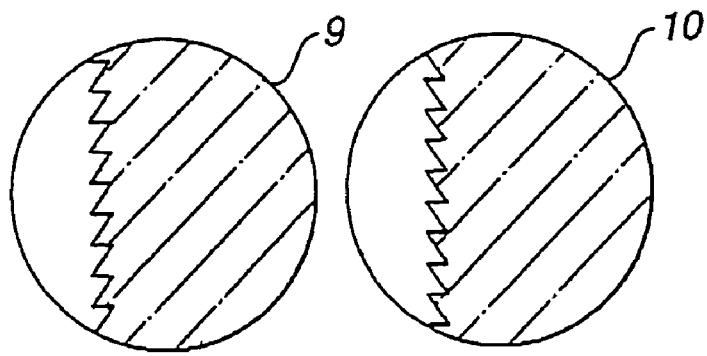
FIG. 17 is an enlarged schematic lateral view of a principal part of the diffraction element of FIG. 16, showings its profile.

FIG. 15 is a schematic lateral view the optical system of still another embodiment of optical pickup device according to the invention, wherein the a pair of diffraction elements 9, 10 are arranged on the light path from the light sources to the photodetector and each of the diffraction elements 9, 10 carries thereon a diffraction pattern on one of the pair of parallel surface planes as shown in FIG. 16. Note that, as shown in FIG. 17, the diffraction patterns arranged on the corresponding respective surfaces of the plates, each having a pair of parallel surface planes, are mirror images relative to each other.

With this arrangement, the light beams to be detected by the photodetector 7 for the first reflected light beam and the second reflected light beam do not need to be diffracted by the respective diffraction elements 9, 10. More specifically, for examples, it may be so arranged that the diffracted light beam of the 0-th degree (or the light beam that is not diffracted) from the diffraction elements 9, 10 for the first reflected light beam is detected by the photodetector 7 and the diffracted light beam of the 1st degree from the diffraction elements 9, 10 for the second reflected light beam is detected by the photodetector 7.

With this arrangement or providing a pair of diffraction elements 9, 10, the influence of the fluctuations of the ambient temperature can be minimized. Since the change in the diffraction pattern due to the fluctuations of the ambient temperature occurs both in the medium of the diffraction element 9 and that of the diffraction element 10 in a similar manner, the effect of diffraction of one of the reflected light beam offsets that of the other reflected light beam so that consequently the light beams transmitted through the diffraction elements 9, 10 are not affected.

Additionally, the change in the diffraction angle due to the change in the oscillation wavelength of each of the laser chips of the laser diode is offset by the diffraction patterns of the diffraction elements 9, 10 so that consequently the spots of reflected light on the light receiving sections of the photodetector 7 are not shifted if the oscillation frequencies of the laser diode are made to vary by the fluctuations in the ambient temperature. While the displacement of the optical path between the diffraction patterns can not be corrected, it is about 1 μm if the wavelength of either of the light beams changes by 7 nm and hence negligible.

Additionally, in the above described embodiment of optical pickup device, the spots of the reflected light beams on the light receiving sections of the photodetector 7 can be positionally regulated by shifting the diffraction elements 9, 10. Since the medium of the diffraction grating 9 and that of the diffraction grating 10 can be shifted independently, it is easy to shift and regulate the spots of the reflected light beams on the light receiving sections of the photodetector 7. The diffraction angle of either of the diffraction elements 9, 10 can be raised without limitations if it is so arranged that the distance between the diffraction elements 9, 10 can be regulated along the direction of the optical axis.

In the above described embodiment of optical pickup device, the optical axis of the first light beam and that of the second light beam striking the respectively optical discs 106a, 106b can be made to accurately agree with each other, if the diffraction elements 9, 10 are arranged on the forward light path from the light sources to the optical discs. Additionally, when the diffraction elements 9, 10 are arranged on the forward light path, any unnecessary diffracted light can be practically blocked from entering the photodetector even if the diffraction angle of either of the diffraction elements 9, 10 is small.

The diffraction elements 9, 10 may alternatively be arranged on the backward light path from the optical discs 106a, 106b to the photodetector 7. With such an arrangement, the light beam emitted from either of the first and second light source can be utilized efficiently even if the light sources are those of a laser diode and the dispersion angle of each of the light beams therefrom is limited.

Still alternatively, it may be so arranged that both of the light beams to be detected by the photodetector 7 for the first reflected light beam and the second reflected light beam are diffracted by the diffraction elements 9, 10. More specifically, for examples, it may be so arranged that the diffracted light beam of the 1st degree from the diffraction elements 9, 10 for the first reflected light beam is detected by the photodetector 7 and the diffracted light beam of the 2nd degree from the diffraction elements 9, 10 for the second reflected light beam is detected by the photodetector 7. With this arrangement, the diffraction angle of the diffraction element becomes large to reduce the influence of any diffracted light that is unnecessary to the photodetector.

Figure 18:
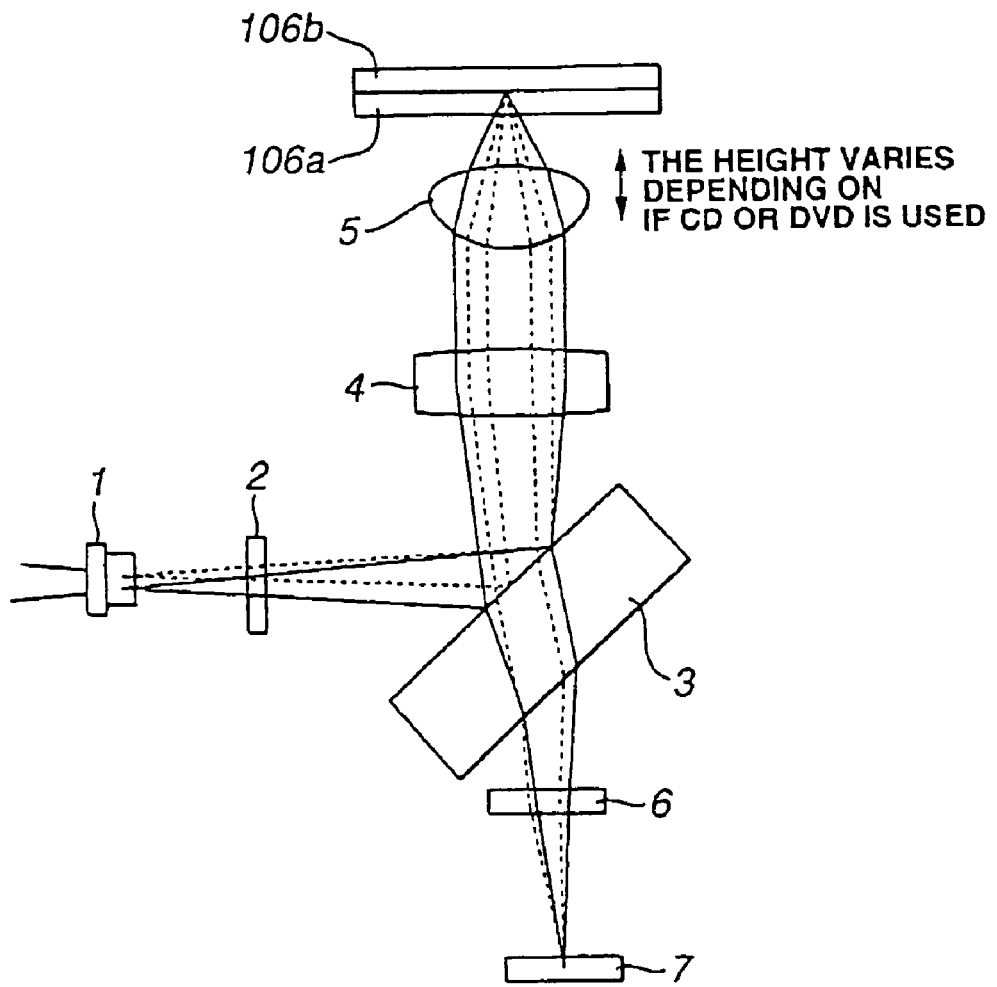
FIG. 18 is a schematic lateral view of the optical system of still another embodiment of optical pickup device according to the invention, comprising a two-wavelength type monolithic laser diode and a diffraction element arranged on the backward light path.
Figure 19:
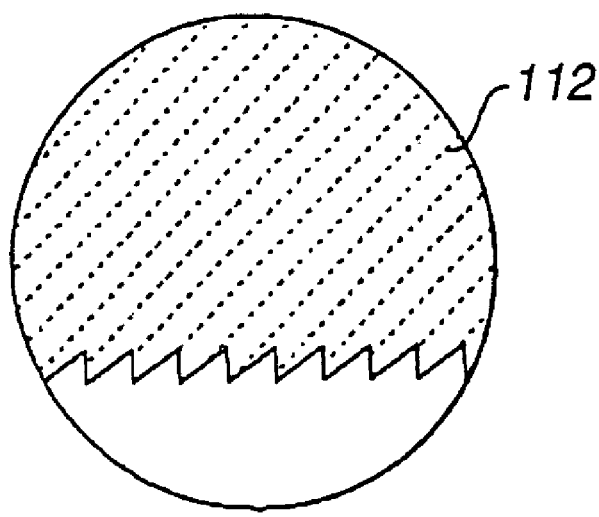
FIG. 19 is a schematic lateral view of the diffraction element of the embodiment of optical pickup device of FIG. 18, showing its profile.

FIG. 18 is a schematic lateral view of the optical system of still another embodiment of optical pickup device according to the invention, comprising a two-wavelength type monolithic laser diode and a diffraction element 6 arranged on the backward light path so that the light beam for a "DVD" and the light beam for a "CD" may be focused on a same spot on a light receiving surface by using the diffracted light beams from the diffraction element 6. As shown in FIG. 19, the diffraction element 6 is a blazed diffraction grating adapted to raise the intensity of the diffracted laser beam of a specific degree.

Figure 20:
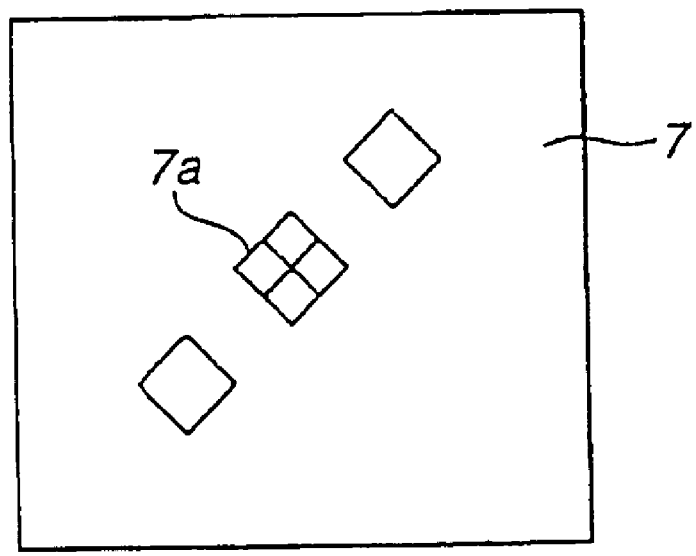
FIG. 20 is an enlarged schematic plane view of a principal part of the light receiving section of the photodetector of the embodiment of optical pickup device of FIG. 18.

As shown in FIG. 20 illustrating an enlarged schematic plane view of a principal part of the light receiving section of the photodetector 7 of the embodiment of optical pickup device of FIG. 18, the light receiving section 7a of the photodetector 7 for receiving the reflected light beam to be used for a "DVD" is adapted to also receive the reflected light beam to be used for a "CD".

With the optical system of this embodiment of optical pickup device, the diffracted light beam of the 0-th degree obtained from the diffraction element 6 for the light beam emitted from one of the laser chips of the laser diode 1 is used for a "DVD", while the diffracted light beam of the 1st degree obtained from the diffraction element 6 for the light beam emitted from the other laser chip of the laser diode 1 is used for a "CD". Then, both the light beam for a "DVD" and the light beam for a "CD" are focused to a same focal point on the light receiving section 7a of the photodetector 7.

The above described optical system is advantageous in that the diffraction angle of the diffraction element 6 is small and the displacement of the spot of light on the light receiving section 7a due to the fluctuations of the ambient temperature is small. However, it should be noted that unnecessary diffracted light can easily get to the light receiving section 7a to degrade the performance of the optical system because of the small diffraction angle of the diffraction element 6.

Figure 21:
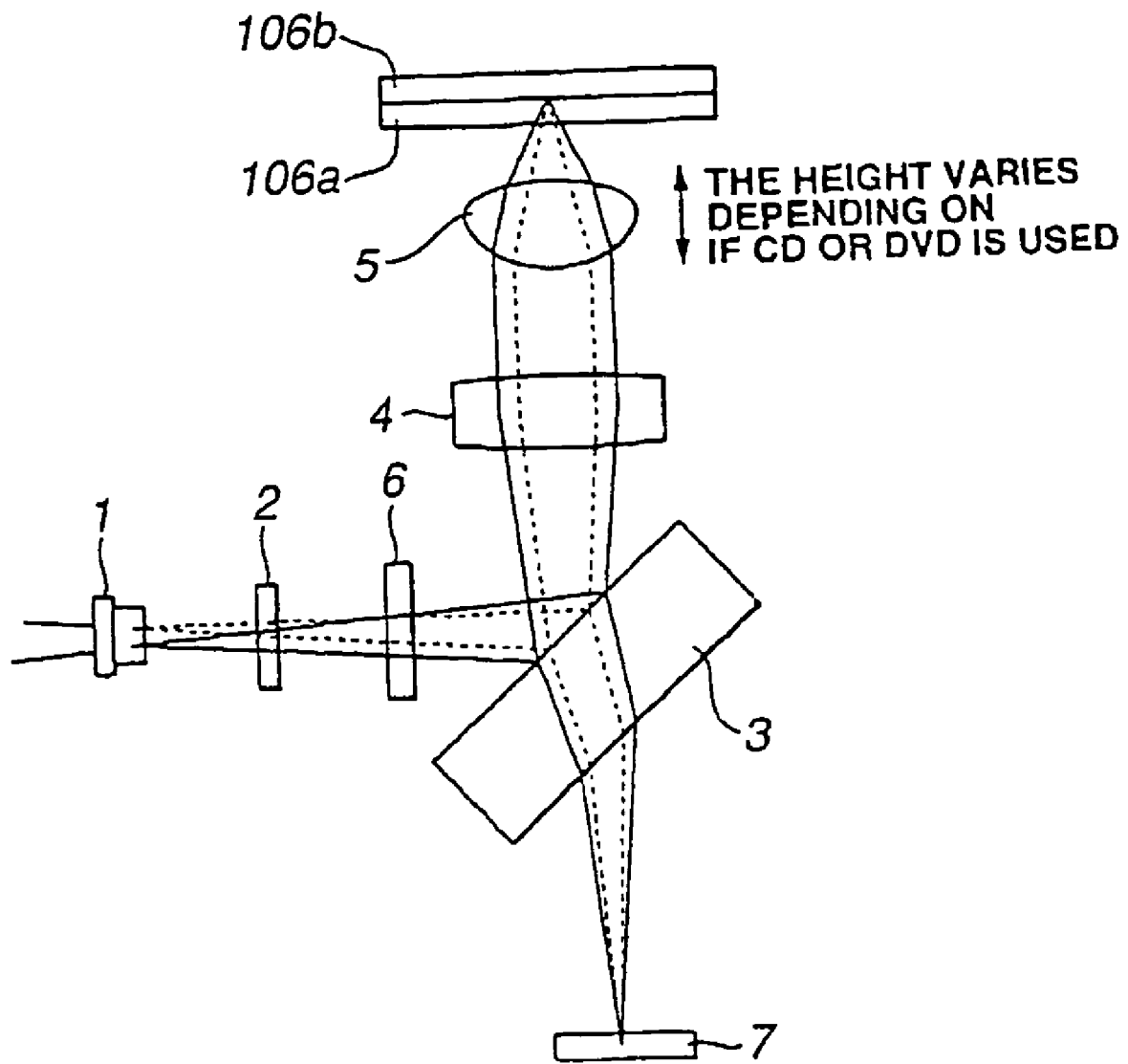
FIG. 21 is a schematic lateral view of the optical system of still another embodiment of optical pickup device according to the invention, comprising a two-wavelength type monolithic laser diode and a diffraction element arranged on the forward light path.

FIG. 21 is a schematic lateral view of the optical the optical system of still another embodiment of optical pickup device according to the invention, comprising a two-wavelength type monolithic laser diode and a diffraction element 6 arranged on the forward light path. With this arrangement, the light beam emitted from the laser diode 1 is made to strike either a "DVD" or a "CD" after passing through the diffraction grating 2, the diffraction element 6, the beam splitter 3, the collimator lens 4 and the objective lens 5.

With this optical system, the diffraction angle of the diffraction element 6 is defined in such a way that the optical axis of the light beam of the 0-th degree from the diffraction element 6 obtained for the light beam emitted from one of the laser chips of the laser diode 1 and that of the light beam of the 1st degree from the diffraction element 6 obtained for the light beam emitted from the other laser chip of the laser diode 1 agree with each other. Thus, the light beams that are made to strike the objective lens 5 along the same optical axis. Then, the light beams coming out of the objective lens 5 are reflected by the respective optical discs and proceed all the way to the photodetector 7 also along the same optical axis.

This optical system is advantageous relative to the optical system where the diffraction element 6 is arranged on the backward light pass from the optical discs in that it is more free from mutual displacement of the focal points and the two light beams can be focused accurately to a same spot on the light receiving section of the photodetector to improve the performance of the optical pickup device.

However, it should be noted that, if the light emitting spots of the laser diode and the diffraction grating are arranged close to each other and the diffraction angle of the diffraction element 6 is made large, the intensity distribution of the spot of light on the "CD" becomes highly asymmetric so that consequently it will be impossible to select a large diffraction angle and hence unnecessary diffracted light can enter the optical system to a large extent.

When the light receiving section of the photodetector is shared by the "DVD" and the "CD" while the light receiving section is divided into four light receiving areas that are arranged radially as viewed from the center thereof so that a so-called astigmatism method is used for detecting a focusing error signal and/or a so-called DPD method is used for detecting a tracking error signal, care should be taken about a number of possible phenomena including that the efficiency of utilization of light can be reduced due to an excessive low diffraction efficiency of the diffraction element, that the degree of freedom for regulating the optical system can be reduced due to an excessive small diffraction angle, that the optical system can show a degraded resistance to temperature changes due to the temperature dependency of the performance of the diffraction element and that the optical performance of the optical system can become degraded as a result of an inclined optical axis.

An optical disc device according to the invention comprises an optical pickup device according to the invention and a rotary operating mechanism for holding and driving an optical disc, or an optical recording medium, which may be a "DVD" or a "CD". The rotary operating mechanism is adapted to align the optical disc to itself by referring to the chucking hole arranged at the center of the optical disc and hold the optical disc at a peripheral area of the chucking hole to drive it to rotate.

The optical pickup device is supported in the optical disc device in such a way that it is movable in radial directions of the optical disc with the objective lens disposed vis-a-vis the signal recording surface of the optical disc that is driven to rotate by the rotary operating mechanism. Then, the optical pickup device is driven to move in a radial direction of the optical disc by means of a feed mechanism.

The optical disc device further comprises a control circuit for controlling the optical pickup device, the rotary operating mechanism and the feed mechanism. The optical disc device additionally comprises a demodulation circuit for demodulating the signal read from the optical disc by the optical pickup device and output from the latter.

What is claimed is:

1. An optical pickup device comprising:
   a first light source for emitting a first light beam having a first wavelength generally alone an optical axis;
   a second light source for emitting a second light beam having a second wavelength different from the first wavelength generally along the optical axis;
   a beam splitter disposed on the optical axis in order to reflect and deflect the first and second light beams by 90° relative to the optical axis along a first reflect/deflect optical axis and a second reflect/deflect optical axis extending parallel to the first reflect/deflect optical axis;
   a two-type optical recording medium disposed on and extending perpendicularly to the first reflect/deflect optical axis, the optical recording medium having two signal recording surfaces;
   an objective lens disposed on the first reflect/deflect optical axis for focusing said first light beam or said second light beam from the beam splitter to the signal recording surface of the optical recording medium of a first type matching to the first wavelength or that of the optical recording medium of a second type matching to the second wavelength, whichever appropriate;
   a photodetector for detecting the light beam focused on the signal recording surface of the optical recording medium of the first type or that of the optical recording medium of the second type, whichever appropriate, by the objective lens and reflected by the signal recording surface; and
   a diffraction element disposed on the second reflect/deflect optical axis between the beam splitter and the photodetector, the diffraction element carrying a pair of diffraction gratings arranged on the opposite surface planes of a single plate of a diffraction medium;
   at least either the first light beam adapted to be used for reading information signals from the signal recording surface of the optical recording medium of the first type and reflected by the reflecting surface or the second light beam adapted to be used for reading information signals from the signal recording surface of the optical recording medium of the second type and reflected by the reflecting surface being diffracted by the diffraction element,
   the first reflected light beam and the second reflected light beam being focused to a same spot on a light receiving surface of the photodetector.

2. An optical pickup device comprising:
   a light beam source having a first light source for emitting a first light beam having a first wavelength generally along an optical axis and a second light source for emitting a second light beam having a second wavelength different from the first wavelength generally along the optical axis;
   a beam splitter disposed on the optical axis in order to reflect and deflect the first and second light beams by 90° relative to the optical axis along a first reflect/deflect optical axis and a second reflect/deflect optical axis extending parallel to the first reflect/deflect optical axis;

a two-type optical recording medium disposed on and extending perpendicularly to the first reflect/deflect optical axis, the optical recording medium having two signal recording surfaces;

an objective lens disposed in the first reflect/deflect optical axis for focusing said first light beam or said second light beam from the beam splitter to the signal recording surface of an optical recording medium of a first type matching to the first wavelength or that of an optical recording medium of a second type matching to the second wavelength, whichever appropriate;

a photodetector disposed on the second reflect/deflect optical axis for detecting the light beam focused on the signal recording surface of the optical recording medium of the first type or that of the optical recording medium of the second type, whichever appropriate, by the objective lens and reflected by the signal recording surface;

a diffraction grating disposed on the optical axis between the light source and the beam splitter; and at least one diffraction element disposed between the diffraction grating and the beam splitter, the at least one diffraction element carrying a pair of diffraction gratings arranged on the opposite surface planes of a single plate of a diffraction medium;

each of the first light beam adapted to be used for reading information signals from the signal recording surface of the optical recording medium of the first type and reflected by the reflecting surface and the second light beam adapted to be used for reading information signals from the signal recording surface of the optical recording medium of the second type and reflected by the reflecting surface being diffracted by the diffraction element, the first reflected light beam and the second reflected light beam being focused to a same spot on a light receiving surface of the photodetector.

3. An optical disc device comprising:

a rotary operating mechanism for driving one or more than one optical discs operating so many pieces of optical recording medium as to rotate; and an optical pickup device arranged opposite to the signal recording surfaces of the one or more than one optical discs driven to rotate by said rotary operating mechanism;

said optical pickup device comprising:

a first light source for emitting a first light beam having a first wavelength generally along an optical axis;

a second light source for emitting a second light beam having a second wavelength different from the first wavelength generally along the optical axis;

a beam splitter disposed on the optical axis in order to reflect and deflect the first and second light beams by 90° relative to the optical axis along a first reflect/deflect optical axis and a second reflect/deflect optical axis extending parallel to the first reflect/deflect optical axis;

a two-type optical recording medium disposed on and extending perpendicularly to the first reflect/deflect optical axis, the optical recording medium having two signal recording surfaces;

an objective lens disposed on first reflect/deflect optical axis for focusing said first light beam or said second light beam from beam splitter to the signal recording surface of the optical recording medium of a first type matching to the first wavelength or that of the optical recording medium of a second type matching to the second wavelength, whichever appropriate;

a photodetector disposed on the second reflect/deflect optical axis for detecting the light beam focused on the signal recording surface of the optical recording medium of the first type or that of the optical recording medium of the second type, whichever appropriate, by the objective lens and reflected by the signal recording surface; and a diffraction element disposed on the second reflect/deflect optical axis between the beam splitter and the photodetector, the diffraction element carrying a pair of diffraction gratings arranged on the opposite surface planes of a single plate of a medium;

at least either the first light beam adapted to be used for reading information signals from the signal recording surface of the optical recording medium of the first type and reflected by the reflecting surface or the second light beam adapted to be used for reading information signals from the signal recording surface of the optical recording medium of the second type and reflected by the reflecting surface being diffracted by the diffraction element, the first reflected light beam and the second reflected light beam being focused to a same spot on a light receiving surface of the photodetector.

4. An optical disc device comprising:

a rotary operating mechanism for driving one or more than one optical discs operating so many pieces of optical recording medium as to rotate; and an optical pickup device arranged opposite to the signal recording surfaces of the one or more than one optical discs driven to rotate by said rotary operating mechanism;

said optical pickup device comprising:

a light beam source having a first light source for emitting a first light beam having a first wavelength generally along an optical axis and a second light source for emitting a second light beam having a second wavelength different from the first wavelength generally along the optical axis;

a beam splitter disposed on the optical axis in order to reflect and deflect the first and second light beams by 90° relative to the optical axis along a first reflect/deflect optical axis and a second reflect/deflect optical axis extending parallel to the first reflect/deflect optical axis;

a two-type optical recording medium disposed on and extending perpendicularly to the first reflect/deflect optical axis, the optical recording medium having two signal recording surfaces;

an objective lens disposed in the first reflect/deflect optical axis for focusing said first light beam or said second light beam from the beam splitter to the signal recording surface of an optical recording medium of a first type matching to the first wavelength or that of an optical recording medium of a second type matching to the second wavelength, whichever appropriate;

a photodetector disposed on the second reflect/deflect optical axis for detecting the light beam focused on the signal recording surface of the optical recording medium of the first type or that of the optical recording medium of the second type, whichever appropriate, by the objective lens and reflected by the signal recording surface;

a diffraction grating disposed on the optical axis between a light source and the beam splitter; and at least one diffraction element disposed between the diffraction grating and the beam splitter, the at least one diffraction element carrying a pair of diffraction gratings arranged on the opposite surface planes of a single plate of a diffraction medium;

each of the first light beam adapted to be used for reading information signals from the signal recording surface of the optical recording medium of the first type and reflected by the reflecting surface and the second light beam adapted to be used for reading information signals from the signal recording surface of the optical recording medium of the second type and reflected by the reflecting surface being diffracted by the diffraction element, the first reflected light beam and the second reflected light beam being focused to a same spot on a light receiving surface of the photodetector.

* * * * *